(12) United States Patent
Onomoto et al.

(10) Patent No.: US 11,982,327 B2
(45) Date of Patent: May 14, 2024

(54) HYBRID VEHICLE CONTROLLER (71) Applicant: TOYOTA JIDOSHA KABUSHIKI KAISHA, Toyota (JP)

(72) Inventors: Atsushi Onomoto, Toyoake (JP); Masato Yoshikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 449 days.

(21) Appl. No.: 17/454,021

(22) Filed: Nov. 8, 2021

(65) Prior Publication Data

US 2022/0145949 A1 May 12, 2022

(30) Foreign Application Priority Data

Nov. 10, 2020 (JP) .................................. 2020-187214

(51) Int. Cl.
*F16D 48/06* (2006.01)
*B60K 6/387* (2007.10)
*B60W 20/40* (2016.01)

(52) U.S. Cl.
CPC ............. *F16D 48/06* (2013.01); *B60W 20/40* (2013.01); *B60K 6/387* (2013.01); *B60W 2510/0275* (2013.01); *B60W 2510/083* (2013.01); *B60W 2520/04* (2013.01); *B60Y 2200/92* (2013.01); *F16D 2500/10412* (2013.01);
(Continued)

(58) Field of Classification Search
CPC ........... F16D 48/06; F16D 2500/10412; F16D 2500/30404; F16D 2500/30421; F16D 2500/30428; B60W 20/40; B60W 2510/0275; B60W 2510/083; B60W 2520/04; B60W 30/18054; B60W 2710/081; B60W 2710/083; B60W 10/02; B60W 10/08; B60W 20/15; B60W 30/192; B60W 10/30; B60W 20/00; B60K 6/387; B60K 2006/4825; B60Y 2200/92; Y02T 10/62; Y02T 10/70; Y02T 10/7072

See application file for complete search history.

(56) References Cited

U.S. PATENT DOCUMENTS

2017/0008516 A1* 1/2017 Itagaki .................. B60W 10/08

FOREIGN PATENT DOCUMENTS

JP 2014-201279 A 10/2014
JP 2020-093727 A 6/2020

* cited by examiner

*Primary Examiner* — Aniss Chad
*Assistant Examiner* — Chase L Cooley
(74) *Attorney, Agent, or Firm* — Oblon, McClelland, Maier & Neustadt, L.L.P.

(57) ABSTRACT

A hybrid vehicle controller for controlling a hybrid vehicle including a hybrid system is provided. The hybrid system includes an engine, a motor generator, a battery configured to supply power with the motor generator, a clutch configured to connect the engine to the motor generator, and a relay configured to connect the motor generator to the battery. The hybrid vehicle controller includes processing circuitry. The processing circuitry is configured to execute, when an operation requesting opening of the relay is performed, a process that releases the clutch, a negative torque application process that applies a negative torque, which is a torque for lowering a rotational speed of the motor generator, to the motor generator, after releasing the clutch, and a process that releases the relay when the rotational speed of the motor generator becomes less than a threshold.

7 Claims, 5 Drawing Sheets

(52) U.S. Cl.
CPC .............. *F16D 2500/30404* (2013.01); *F16D 2500/30421* (2013.01); *F16D 2500/30428* (2013.01)

Fig.9

HYBRID VEHICLE CONTROLLER

BACKGROUND

1. Field

The present disclosure relates to a hybrid vehicle controller.

2. Description of Related Art

Japanese Laid-Open Patent Publication No. 2014-201279 discloses a hybrid vehicle including a hybrid system. The hybrid system includes an engine, a motor generator, and a battery that powers the motor generator. Further, this hybrid system includes a K0 clutch which is a clutch for connecting or disconnecting the engine and the motor generator. Further, this hybrid system includes a relay for connecting or disconnecting the motor generator and the battery.

The K0 clutch is released between the time when the hybrid system is requested to be stopped and the time when the hybrid system is stopped. When the K0 clutch is released, the motor generator is disconnected from the engine. The relay is then opened and the battery is disconnected from the motor generator.

For the durability of the relay, it is desirable to open the relay without an electric arc. The higher the rotational speed of the motor generator when the relay opens, the more likely it is that an electric arc will occur due to the counter electromotive force. Therefore, it is desirable to open the relay after the rotational speed of the motor generator has become sufficiently low. However, in the above hybrid system, it may take some time for the rotational speed of the motor generator to become sufficiently low.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a hybrid vehicle controller for controlling a hybrid vehicle including a hybrid system is provided. The hybrid system includes an engine, a motor generator, a battery configured to supply power with the motor generator, a clutch configured to connect the engine to the motor generator, and a relay configured to connect the motor generator to the battery. The hybrid vehicle controller includes processing circuitry. The processing circuitry is configured to execute, when an operation requesting opening of the relay is performed, a process that releases the clutch, a negative torque application process that applies a negative torque, which is a torque for lowering a rotational speed of the motor generator, to the motor generator, after releasing the clutch, and a process that releases the relay when the rotational speed of the motor generator becomes less than a threshold.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, the first embodiment of the present disclosure will be described with reference to the drawings.

Figure 1:
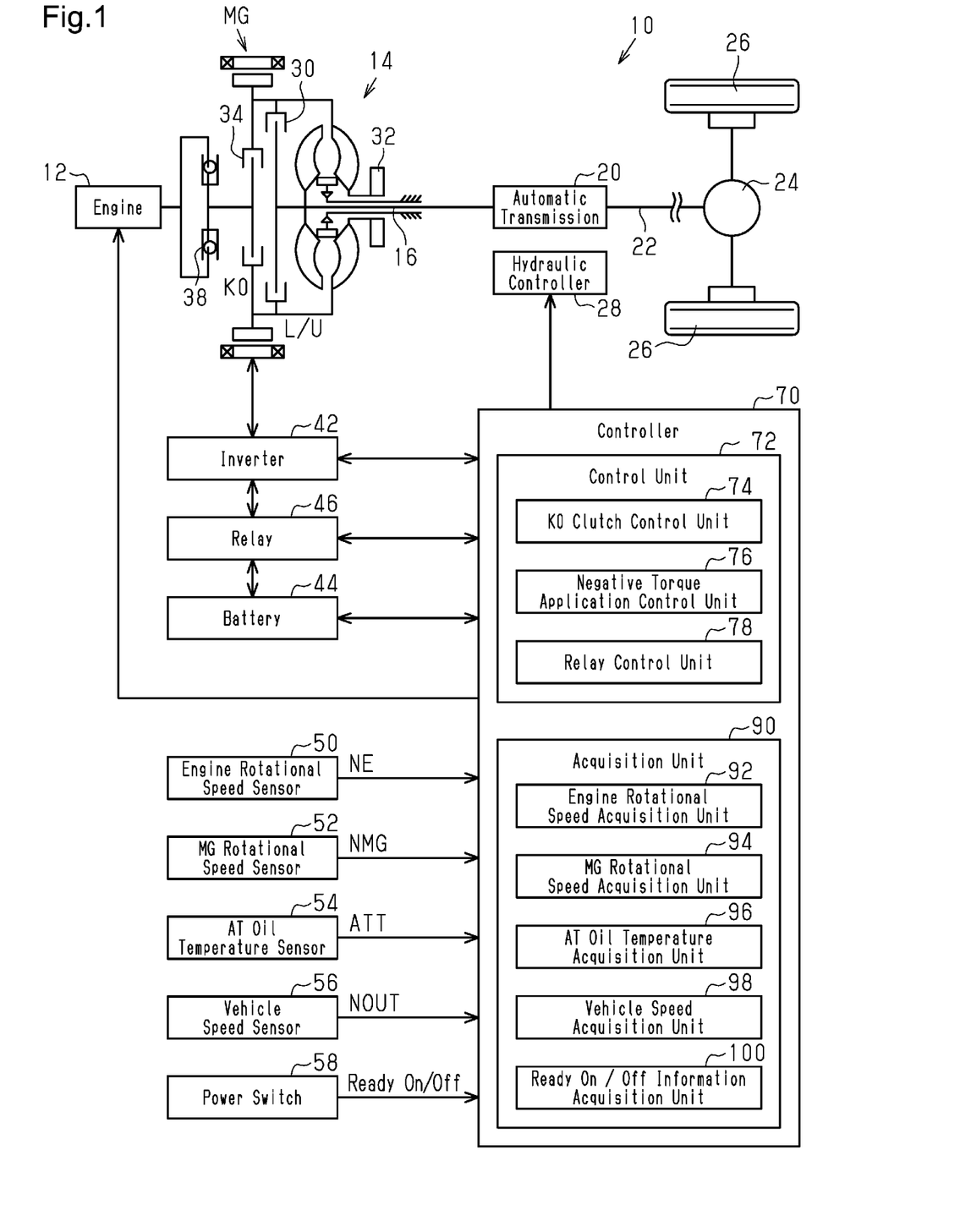
FIG. 1 is a schematic diagram showing a controller according to the first embodiment and a hybrid vehicle that is a control target of the controller.

The schematic configuration of the hybrid vehicle 10 will be described with reference to FIG. 1. FIG. 1 shows a hybrid vehicle 10 and a controller 70 which is a hybrid vehicle controller that controls the hybrid vehicle 10. The hybrid vehicle 10 includes a hybrid system.

The hybrid system is equipped with an engine 12 and a motor generator MG as a driving force source for driving. The engine 12 is an internal combustion engine such as a gasoline engine or a diesel engine. The motor generator MG has an electric motor mode and a generator mode.

The outputs of the engine 12 and the motor generator MG are transmitted from the torque converter 14, which is a fluid power transmission device, to the automatic transmission 20 via the turbine shaft 16. The output transmitted to the automatic transmission 20 is further transmitted to the left and right drive wheels 26 via the output shaft 22, the differential gear device 24, and the like.

The torque converter 14 includes a lockup clutch 30 that directly connects the pump impeller and the turbine impeller. A mechanical oil pump 32 is integrally connected to the pump impeller, which is a rotating member on the input side. The pump impeller generates hydraulic pressure by being mechanically rotationally driven by the engine 12 and the motor generator MG. In this way, the pump impeller supplies hydraulic pressure to the hydraulic controller 28. The lockup clutch 30 is engaged or released by an electromagnetic hydraulic control valve, a switching valve, or the like provided on the hydraulic controller 28.

The hybrid system is further equipped with a K0 clutch 34 that connects the engine 12 to the motor generator MG. The K0 clutch 34 is provided between the engine 12 and the motor generator MG. The output shaft of the engine 12 is connected to the first end of the rotating shaft of the motor generator MG via the K0 clutch 34. The second end of the rotating shaft of the motor generator MG is connected to the torque converter 14. A damper 38 is disposed between the K0 clutch 34 and the engine 12. The damper 38 absorbs torque fluctuations of the engine 12 and torsional vibrations. The damper 38 is also called a torsional damper, and is configured to include an elastic body such as a compression coil spring. The K0 clutch 34 is a wet single-plate or multi-plate hydraulic friction engagement device that is hydraulically engaged by friction. The K0 clutch 34 connects and disconnects the engine 12 to the motor generator MG.

The hybrid system is further equipped with a battery 44 that supplies power to the motor generator MG, and a relay 46 that connects the motor generator MG to the battery 44. In this embodiment, the relay 46 is provided between the inverter 42 and the battery 44. The motor generator MG is connected to the battery 44 via the inverter 42. The automatic transmission 20 is, for example, a stepped automatic transmission such as a planetary gear type. The automatic transmission 20 changes the gear ratio by engaging or disengaging a plurality of hydraulic friction engaging devices (clutch or brake). The shift control is performed by using an electromagnetic hydraulic control valve, a switching valve, or the like provided on the hydraulic controller 28. The automatic transmission 20 may be in a neutral state in which power transmission is cut off by releasing the input clutch.

The controller 70 includes a microcomputer having a central processing unit (CPU), read-only memory (ROM), random-access memory (RAM), an input/output interface, and the like. The controller 70 performs signal processing according to a program stored in advance in the ROM while using the temporary storage function of the RAM.

The controller 70 includes a control unit 72 and an acquisition unit 90.

The control unit 72 includes a K0 clutch control unit 74, a negative torque application control unit 76, and a relay control unit 78.

The K0 clutch control unit 74 performs a process of releasing the K0 clutch 34. For example, the K0 clutch control unit 74 performs a process of releasing the K0 clutch 34 after an operation requesting the release of the relay 46 is performed.

After releasing the K0 clutch 34, the negative torque application control unit 76 performs a negative torque application process in which a negative torque, which is a torque for lowering the rotational speed of the motor generator MG, is applied to the motor generator MG. Here, the torque in the direction of rotating the motor generator MG in the forward direction is called a positive torque, and the torque in the direction of rotating the motor generator MG in the reverse direction is called a negative torque. In the negative torque application process, a negative torque is applied to the motor generator MG when the motor generator MG is rotating in the forward direction due to inertia. That is, in the negative torque application process, the motor generator MG generates electricity and the rotational energy is converted into electrical energy. That is, the negative torque application process reduces the rotational speed of the motor generator MG by regenerative braking.

The relay control unit 78 performs a process of releasing the relay 46 when the rotational speed of the motor generator MG becomes smaller than the MG rotational speed threshold.

The acquisition unit 90 includes an engine rotational speed acquisition unit 92, an MG rotational speed acquisition unit 94, an AT oil temperature acquisition unit 96, a vehicle speed acquisition unit 98, and a ReadyOn/Off information acquisition unit 100. ReadyOn means that the power switch 58 is pressed to activate the hybrid system and the power switch 58 is "ON". ReadyOff means that the power switch 58 is pressed to shut down the hybrid system and the power switch 58 is "OFF". The engine rotational speed acquisition unit 92 acquires a signal representing the rotational speed NE of the engine 12 from the engine rotational speed sensor 50. The MG rotational speed acquisition unit 94 acquires a signal representing the rotational speed NMG of the motor generator MG from the MG rotational speed sensor 52. The AT oil temperature acquisition unit 96 acquires a signal representing the AT oil temperature ATT from the AT oil temperature sensor 54. AT Oil temperature ATT is the temperature of the oil in the torque converter 14. The vehicle speed acquisition unit 98 acquires a signal representing rotational speed NOUT of the output shaft 22 from the vehicle speed sensor 56. Next, the vehicle speed acquisition unit 98 calculates the vehicle speed V based on the rotational speed NOUT. The ReadyOn/Off information acquisition unit 100 acquires a signal indicating ReadyON/OFF from the power switch 58. The acquisition unit 90 can acquire various information necessary for various controls.

Figure 2:
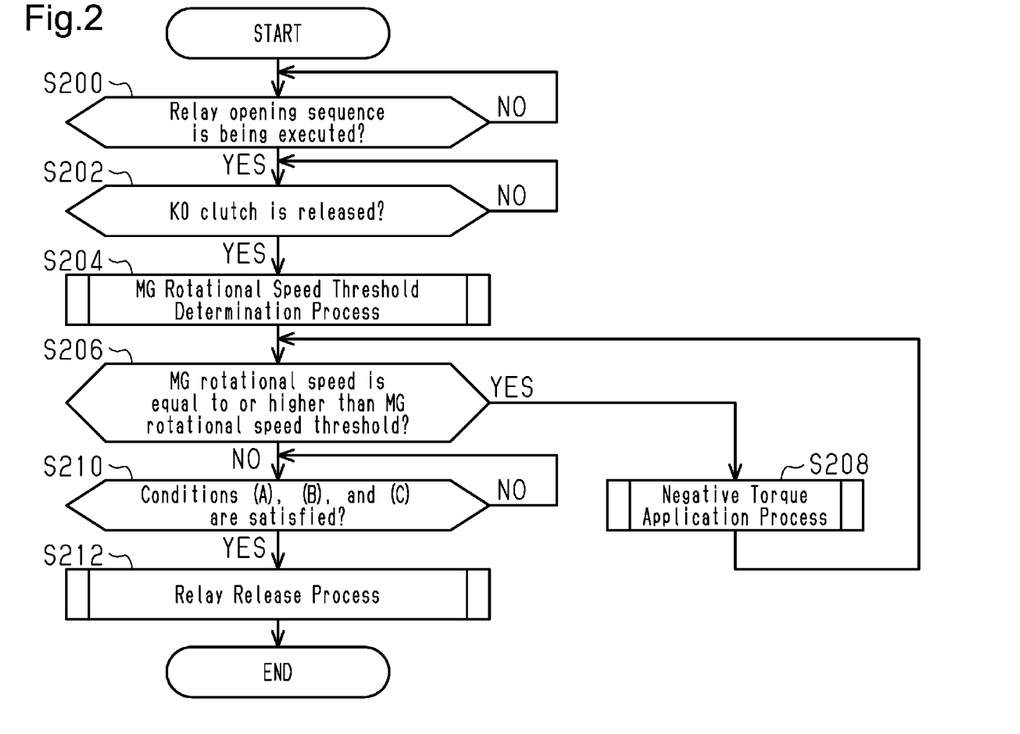
FIG. 2 is a flowchart showing a process for opening a relay in the hybrid vehicle.

FIG. 2 is a flowchart showing a process for opening the relay 46 in the hybrid vehicle 10. The first letter S of the reference numerals means a step.

The controller 70 determines whether or not the relay opening sequence is being executed (S200). The relay opening sequence is started when an operation requesting the release of the relay 46 is performed. For example, the relay opening sequence is started when the signal acquired by the ReadyOn/Off information acquisition unit 100 is switched from the signal representing ReadyON to the signal representing ReadyOFF. The relay opening condition will be described later. The K0 clutch control unit 74 performs a process of releasing the K0 clutch 34 when the relay opening sequence is started. The controller 70 executes S200 again when the relay opening sequence is not executed (S200: No). The controller 70 proceeds to S202 if the relay opening sequence is being executed (S200: Yes).

The controller 70 determines whether or not the K0 clutch 34 is released (S202). The controller 70 executes S202 again when the K0 clutch 34 is not released (S202: No). The controller 70 proceeds to S204 when the K0 clutch 34 is released (S202: Yes).

The controller 70 executes the MG rotational speed threshold determination process (S204). The details of the MG rotational speed threshold determination process will be described later with reference to FIG. 3. The controller 70 determines the MG rotational speed threshold through the MG rotational speed threshold determination process so that the electric arc that can occur due to opening the relay 46 is sufficiently small if the MG rotational speed is less than the MG rotational speed threshold. The controller 70 determines whether the MG rotational speed is equal to or greater than the MG rotational speed threshold (S206). The controller 70 proceeds to S208 when MG rotational speed is equal to or higher than MG rotational speed threshold (S206: Yes). The controller 70 executes the negative torque application process (S208) and proceeds to S206. The details of the negative torque application process will be described later with reference to FIG. 4. The controller 70 proceeds to S210 when MG rotational speed is less than MG rotational speed threshold (S206: No). That is, the controller 70 terminates the negative torque application process when the rotational speed of the motor generator MG becomes less than the MG rotational speed threshold.

The controller 70 determines whether or not the relay opening condition is satisfied (S210). The controller 70 executes S210 again when the relay opening condition is not satisfied (S210: No). The controller 70 proceeds to S212 when the relay opening condition is satisfied (S210: Yes). The relay opening condition being satisfied means that all of the following three conditions (A), (B), and (C) are satisfied: (A) the engine 12 has stopped; (B) the motor generator MG has stopped; and (C) the hybrid vehicle 10 has stopped. The three conditions (A), (B), and (C) may be determined at the same time or may be determined sequentially. The engine 12 may be stopped by performing an operation requesting the opening of the relay 46.

The controller 70 executes the relay release process (S212). Specifically, the relay 46 is opened, and charge removal, which is a process of removing the charge remaining in the motor generator MG, is performed. Specifically, in the charge removal process, the motor generator MG is controlled to be driven to consume the charge remaining in the circuit. When the charge removal process is completed, the controller 70 ends this flow. That is, the controller 70 ends the relay opening sequence.

Figure 3:
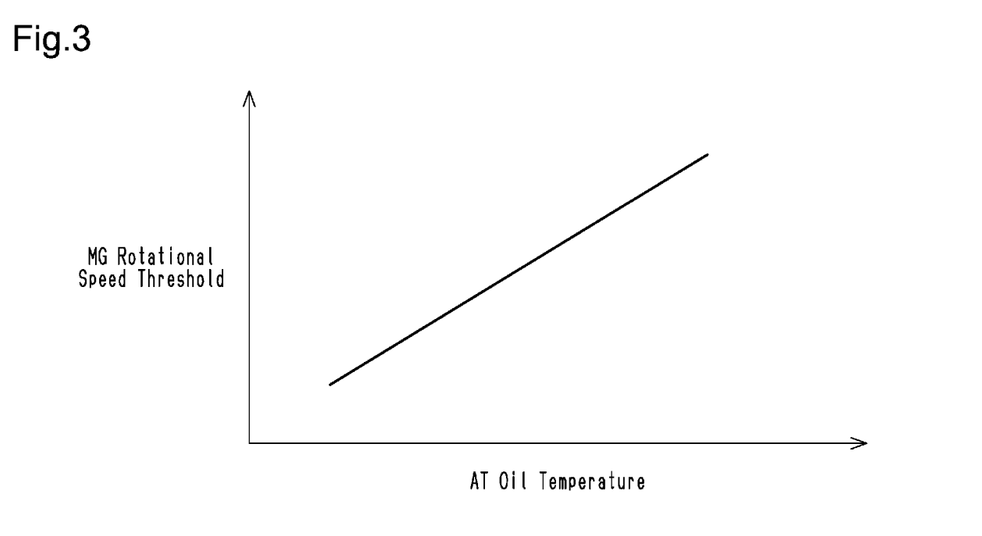
FIG. 3 is a graph showing the relationship between MG rotational speed threshold and AT oil temperature.

With reference to FIG. 3, the relationship between the MG rotational speed threshold determined through the MG rotational speed threshold determination process in FIG. 2 and the AT oil temperature ATT will be described. As shown in FIG. 3, the MG rotational speed threshold increases as the AT oil temperature ATT increases. That is, the controller 70 sets the MG rotational speed threshold to a larger value as the AT oil temperature, which is the temperature of the oil in the torque converter 14, is higher.

Figure 4:
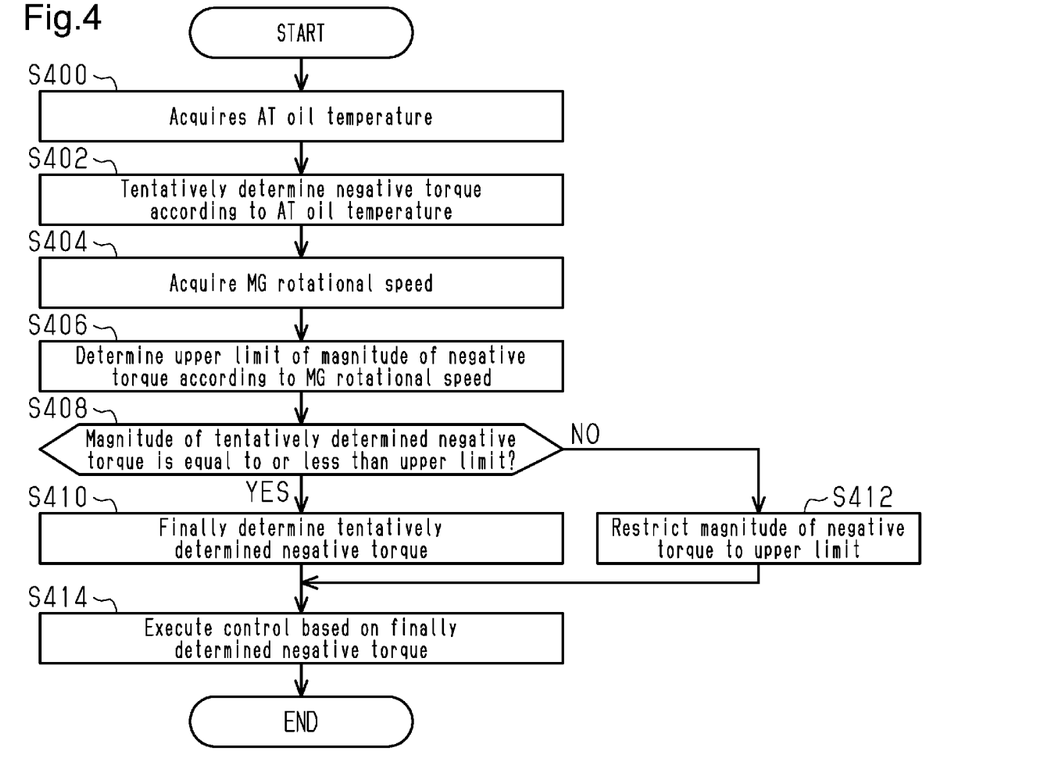
FIG. 4 is a flowchart showing a negative torque application process.

The negative torque application process in FIG. 2 will be described with reference to FIG. 4 The controller 70 first acquires AT oil temperature ATT (S400). The controller 70 tentatively determines the negative torque according to the AT oil temperature ATT (S402). The details of the tentative determination of the negative torque according to the AT oil temperature ATT will be described later with reference to FIG. 5.

The controller 70 acquires MG rotational speed (S404). The controller 70 determines the upper limit of the magnitude of the negative torque according to the MG rotational speed (S406). The details of determining the upper limit of the magnitude of the negative torque according to MG rotational speed will be described later with reference to FIG. 6.

The controller 70 determines whether or not the magnitude of the tentatively determined negative torque is equal to or less than the upper limit (S408). The controller 70 proceeds to S410 when the magnitude of the tentatively determined negative torque is equal to or less than the upper limit (S408: Yes). The controller 70 finally determines the tentatively determined negative torque (S410). The controller 70 proceeds to S412 when the magnitude of the tentatively determined negative torque is larger than the upper limit (S408: No). The controller 70 restricts the magnitude of negative torque to the upper limit (S412). That is, the controller 70 finally determines a negative value having a magnitude equal to the upper limit as a negative torque (S412).

The controller 70 then executes control based on the determined negative torque (S414). That is, the negative torque, which is a torque for lowering the rotational speed of the motor generator MG, is added to the motor generator MG. The value of negative torque is negative. The larger the magnitude of the negative torque, that is, the larger the absolute value of the negative torque value, the easier it is for the rotational speed of the motor generator MG to decrease.

Figure 5:
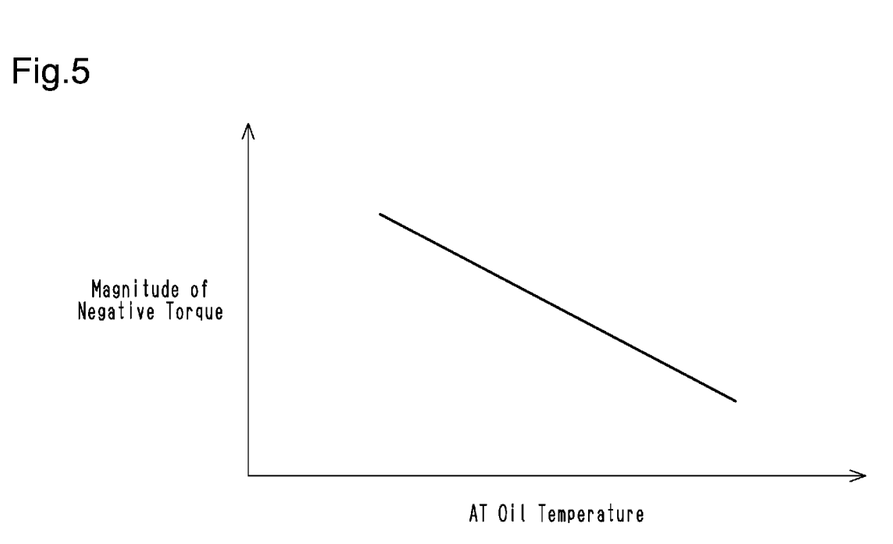
FIG. 5 is a graph showing the relationship between the magnitude of negative torque and AT oil temperature.

FIG. 5 shows the relationship between the negative torque tentatively determined through S402 and the AT oil temperature ATT. As shown in FIG. 5, the magnitude of the negative torque decreases as the AT oil temperature ATT increases. That is, the controller 70 sets in S402 the magnitude of the negative torque to a smaller value as the oil temperature, which is the temperature of the oil in the torque converter 14, is higher.

Figure 6:
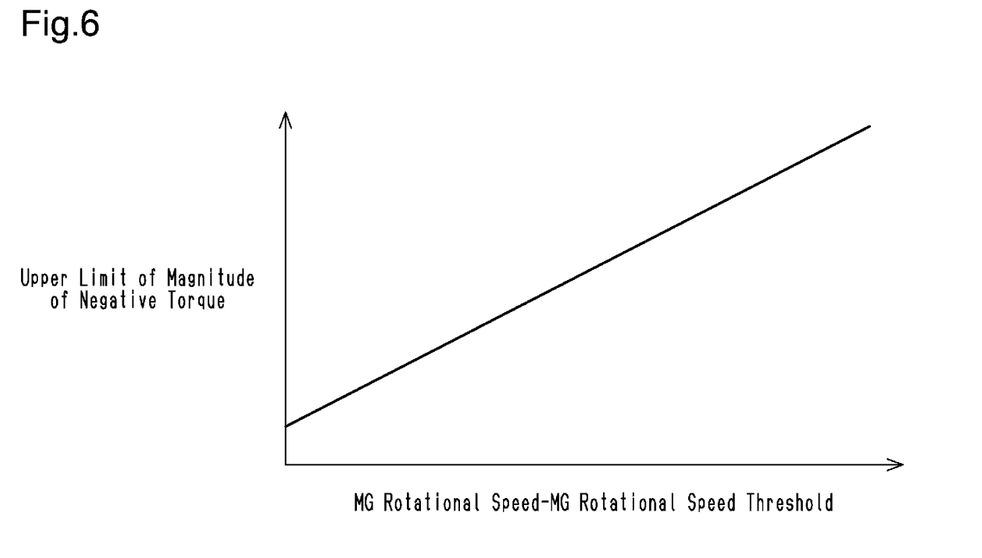
FIG. 6 is a graph showing the relationship between the upper limit of the magnitude of negative torque and MG rotational speed.

FIG. 6 shows the relationship between the upper limit of the magnitude of the negative torque determined through S406 and MG rotational speed. The horizontal axis of the graph shown in FIG. 6 shows the difference between MG rotational speed minus MG rotational speed threshold.

As shown in FIG. 6, as the MG rotational speed decreases and the MG rotational speed approaches the MG rotational speed threshold and the above-mentioned difference decreases, the upper limit of the magnitude of the negative torque decreases. In the negative torque application process, the magnitude of the negative torque is limited by the upper limit thus determined. That is, the negative torque application process includes a restriction process that restricts the magnitude of the negative torque. The restriction process restricts the magnitude of the negative torque to a smaller value when the rotational speed of the motor generator MG is closer to the MG rotational speed threshold. In other words, the restriction process restricts the magnitude of the negative torque to the first magnitude when the rotational speed of the motor generator MG approaches the MG rotational speed threshold. That is, the upper limit of the magnitude of the negative torque when the rotational speed of the motor generator MG approaches the MG rotational speed threshold is the first magnitude. The restriction process restricts the magnitude of the negative torque to a second magnitude when the rotational speed of the motor generator MG is far from the MG rotational speed threshold. That is, the upper limit of the magnitude of the negative torque when the rotational speed of the motor generator MG is far from the MG rotational speed threshold is the second magnitude. Here, the first magnitude is smaller than the second magnitude.

Figure 7:
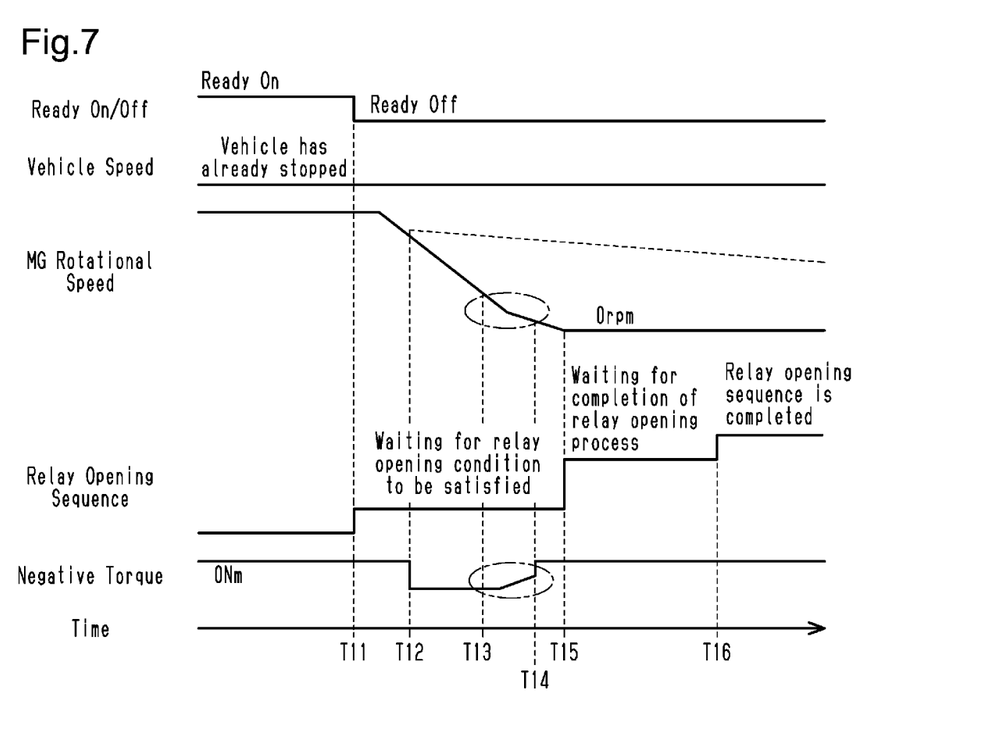
FIG. 7 is a time chart showing changes in ReadyOn/Off, vehicle speed, MG rotational speed, state of the relay opening sequence, and negative torque in the relay opening sequence.

The operation of the first embodiment will be described with reference to FIG. 7. FIG. 7 is a time chart relating to ReadyOn/Off, vehicle speed, MG rotational speed, relay opening sequence state, and negative torque. In FIG. 7, as a comparative example, the change in MG rotational speed when the negative torque application process is not performed is shown by a broken line.

At timing T11, the hybrid vehicle 10 has already stopped. At timing T11, the hybrid vehicle 10 switches from ReadyOn to ReadyOff. This starts the relay opening sequence. That is, the relay opening sequence transitions to a state of waiting for the above-mentioned relay opening condition to be satisfied. At timing T11, the hybrid vehicle 10 has already stopped. For this reason, it has already been satisfied that condition (C) hybrid vehicle 10 has stopped out of the three conditions related to the satisfaction of the relay opening condition. Therefore, the state of waiting for the satisfaction of the relay opening condition shown in FIG. 7 means the state of waiting for the satisfaction of the condition (A) the engine 12 being stopped and the condition (B) the motor generator MG being stopped. When the hybrid vehicle 10 is switched from Ready On to Ready Off, combustion in the engine 12 is stopped. After timing T11, the K0 clutch 34 is released. At the timing T12, the controller 70 determines that the K0 clutch 34 is released.

As shown by the broken line, in the comparative example, the MG rotational speed after the timing T12 is less likely to decrease. This is because the K0 clutch 34 is released after the timing T11. When the K0 clutch 34 is engaged, the engine 12 and the motor generator MG are connected. Therefore, when the K0 clutch 34 is engaged, the rotational speed of the motor generator MG also decreases as the rotational speed of the engine 12 decreases. When the K0 clutch 34 is released, the engine 12 and the motor generator MG are disconnected. Therefore, after the K0 clutch 34 is released, the decrease in the rotational speed of the engine 12 does not contribute to the decrease in the rotational speed of the motor generator MG. That is, when the K0 clutch 34 is released, the motor generator MG is not affected by the braking force due to the friction of the engine 12, and the rotational speed of the motor generator MG is less likely to decrease.

In contrast, the controller 70 starts the negative torque application process at timing T12. Therefore, the MG rotational speed decreases earlier than when the negative torque application process is not performed. As described above with reference to FIG. 6, as the MG rotational speed decreases, the upper limit of the magnitude of the negative torque decreases. From timing T13 to timing T14, the magnitude of the negative torque decreases as the MG rotational speed decreases (see the region surrounded by the alternate long and short dash line in FIG. 7). At timing T14, the controller 70 determines that MG rotational speed is less than MG rotational speed threshold. The controller 70 then terminates the negative torque application process at timing T14. When the motor generator MG stops at the timing T15, the relay opening condition is satisfied, and the controller 70 starts the relay opening process. That is, the relay opening sequence transitions to a state of waiting for the completion of the relay opening process. Then, when the relay 46 is opened and the charge removal process is completed, the relay opening sequence is completed (timing T16).

The effect of the first embodiment will be described.

(1) The controller 70 applies a negative torque, which is a torque for reducing the rotational speed of the motor generator MG, to the motor generator MG between the time when the operation requesting the opening of the relay 46 is performed and the time when the hybrid system is stopped. Therefore, it is possible to reduce the time required for the rotational speed of the motor generator MG to decrease.

(2) The negative torque application process may cause the motor generator MG to rotate in the reverse direction. For example, if the negative torque application process is executed when the rotational speed of the motor generator MG is 0, the negative torque causes the motor generator MG to rotate in the reverse direction. If the motor generator MG rotates in the reverse direction, the parts connected to the motor generator MG may fail. Therefore, by stopping the negative torque application process before the rotational speed of the motor generator MG reaches 0, the failure of parts is suppressed. In the above configuration, the controller 70 terminates the negative torque application process when the rotational speed of the motor generator MG becomes less than the MG rotational speed threshold. Therefore, the motor generator MG is less likely to rotate in the reverse direction.

(3) In the above configuration, when the rotational speed of the motor generator MG approaches the MG rotational speed threshold, the magnitude of the negative torque is limited to a small value. Therefore, the motor generator MG is less likely to rotate in the reverse direction.

(4) When AT oil temperature ATT is high, the viscosity of oil decreases. Therefore, when the AT oil temperature ATT is high, the motor generator MG tends to rotate in the reverse direction. In the above configuration, when the AT oil temperature ATT is high, the MG rotational speed threshold is set to a large value. Therefore, when the AT oil temperature ATT is high, the negative torque application process is terminated early. Therefore, in consideration of the AT oil temperature ATT, the reverse rotation of the motor generator MG due to the negative torque application process is suppressed.

(5) In the above configuration, when the AT oil temperature ATT is high, the magnitude of the negative torque is set to a small value. Therefore, in consideration of the AT oil temperature ATT, the reverse rotation of the motor generator MG due to the negative torque application process is suppressed.

Second Embodiment

Hereinafter, the second embodiment of the present disclosure will be described with reference to the drawings. The second embodiment differs from the first embodiment in that the negative torque application process is performed after it is determined that the hybrid vehicle 10 has stopped. Further, in the second embodiment, the process of determining the upper limit of the magnitude of the negative torque described with reference to FIGS. 4 and 6 is omitted.

Figure 8:
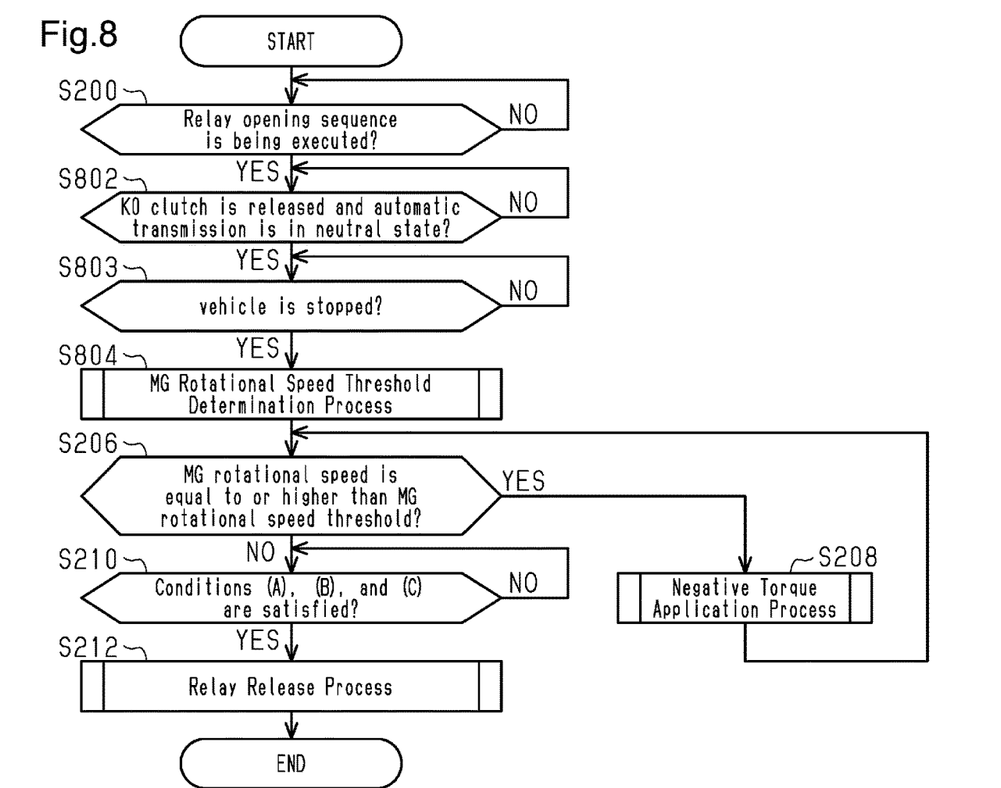
FIG. 8 is a flowchart showing a process for opening a relay in a hybrid vehicle which is a control target of the controller according to the second embodiment.

FIG. 8 is a flowchart showing a process for opening the relay 46 in the hybrid vehicle 10. Note that, in FIG. 8, the same reference numerals are given to the same steps as those in the first embodiment described with reference to FIG. 2.

The controller 70 determines whether the relay opening sequence is being executed (S200). The controller 70 executes S200 again when the relay opening sequence is not executed (S200: No). The controller 70 proceeds to S802 if the relay opening sequence is being executed (S200: Yes). The controller 70 determines whether or not the K0 clutch 34 is released and the automatic transmission 20 is in the neutral state (S802). When the controller 70 makes a negative determination in S802 (S802: No), it executes S802 again. If the controller 70 makes an affirmative determination in S802 (S802: Yes), it proceeds to S803. The controller 70 determines whether the hybrid vehicle 10 is stopped (S803). If the controller 70 determines that the hybrid vehicle 10 is not stopped (S803: No), it executes S803 again. If the controller 70 determines that the hybrid vehicle 10 is stopped (S803: Yes), it proceeds to S804. Specifically, the controller 70 determines that hybrid vehicle 10 is stopped when the vehicle speed is less than or equal to the specified value (S803: Yes). The controller 70 executes the MG rotational speed threshold determination process (S804). As described above, in this second embodiment, the process of setting the upper limit of the magnitude of the negative torque is omitted. That is, the MG rotational speed threshold determination process executed here is a process in which S404 to S412 are omitted in the flowchart of the MG rotational speed threshold determination process described with reference to FIG. 4. Therefore, in the MG rotational speed threshold determination process of the second embodiment, the negative torque is determined according to the AT oil temperature ATT (S402), and the control is executed using the determined negative torque as it is (S414). The controller 70 determines whether the MG rotational speed is equal to or greater than the MG rotational speed threshold (S206). The controller 70 proceeds to S208 when MG rotational speed is equal to or higher than MG rotational speed threshold (S206: Yes). The controller 70 executes the negative torque application process (S208) and proceeds to S206. The controller 70 proceeds to S210 when MG rotational speed is less than MG rotational speed threshold (S206: No). The controller 70 determines whether or not the relay opening condition is satisfied (S210). The controller 70 executes S210 again when the relay opening condition is not satisfied (S210: No). The controller 70 proceeds to S212 when the relay opening condition is satisfied (S210: Yes). The controller 70 executes the relay release process (S212) and ends this flow. Thus, in the second embodiment, the controller 70 performs the negative torque application process on condition that the hybrid vehicle 10 is stopped.

Figure 9:
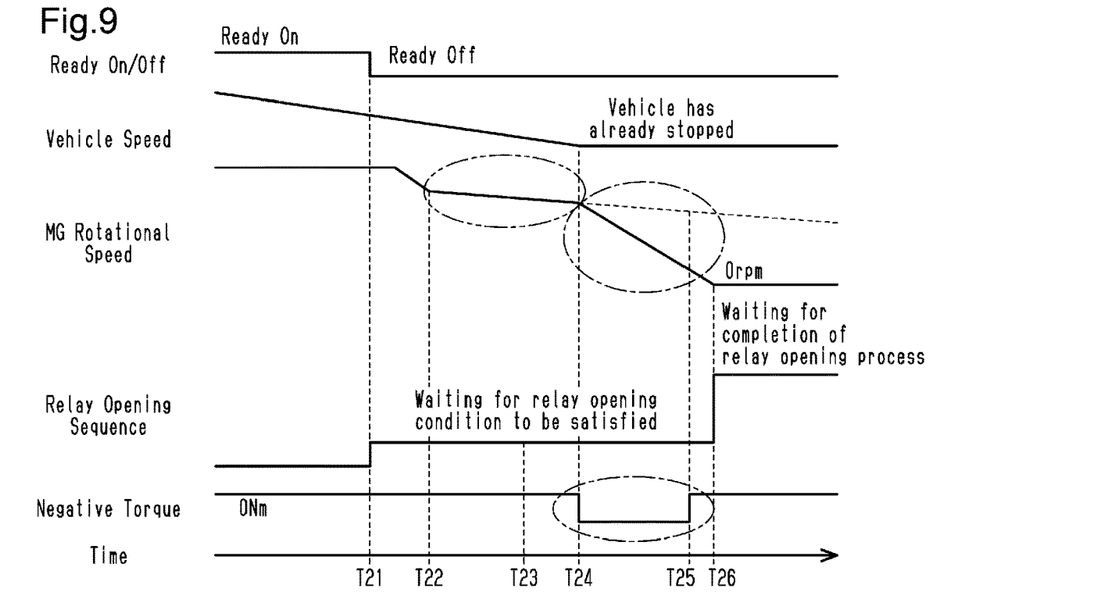
FIG. 9 is a time chart showing changes in ReadyOn/Off, vehicle speed, MG rotational speed, state of the relay opening sequence, and negative torque in the relay opening sequence.

The operation of the second embodiment will be described with reference to FIG. 9. FIG. 9 is a time chart relating to ReadyOn/Off, vehicle speed, MG rotational speed, relay opening sequence state, and negative torque. Note that FIG. 9 shows the change in MG rotational speed when the negative torque application process is not performed with a broken line as in FIG. 7.

At timing T21, the hybrid vehicle 10 is not stopped and is moving. At timing T21, the hybrid vehicle 10 switches from ReadyOn to ReadyOff. This starts the relay opening sequence. That is, the relay opening sequence transitions to a state of waiting for the above-mentioned relay opening condition to be satisfied. In detail, this means a state of waiting for the satisfaction of the condition (A) that the engine 12 has stopped, the condition (B) that the motor generator MG has stopped, and the condition (C) that the hybrid vehicle 10 has stopped. After timing T21, the K0 clutch 34 is released. In addition, the automatic transmission 20 goes into neutral. At timing T22, the K0 clutch 34 is released and the automatic transmission 20 is in the neutral state. However, at timing T22, the hybrid vehicle 10 has not stopped. Therefore, at timing T22, the negative torque application process is not executed. That is, the negative torque application process is not executed before the hybrid vehicle 10 stops (see in particular the area enclosed by the long dashed double-dotted line). At timing T23, the engine 12 stops and condition (A) is satisfied. At the timing T24, the controller 70 determines that the hybrid vehicle 10 has stopped. That is, the condition (C) is satisfied at the timing T24. controller 70 starts the negative torque application process at timing T24 (see the area enclosed by the alternate long and short dash line). Therefore, after the timing T24, the MG rotational speed decreases earlier than when the negative torque application process is not performed. At timing T25, the controller 70 determines that MG rotational speed is less than MG rotational speed threshold. This ends the negative torque application process. Then, at the timing T26, the motor generator MG is stopped, and the condition (B) is satisfied. As a result, the relay opening condition is satisfied, and the controller 70 starts the relay opening process. That is, the relay opening sequence transitions to a state of waiting for the completion of the relay opening process.

The effect of the second embodiment will be described. According to the second embodiment, in addition to the effects of (1), (2), (4) and (5) in the first embodiment, the following effects can be obtained.

(6) It may be required to restart the engine 12 before the hybrid vehicle 10 stops. The restart of the engine 12 is performed by increasing the rotational speed of the engine 12 using the motor generator MG. In this case, it is preferable that the rotational speed of the motor generator MG is high. In the above configuration, no negative torque is applied to the motor generator MG before the hybrid vehicle 10 is stopped. Therefore, before the hybrid vehicle 10 stops, the rotational speed of the motor generator MG is unlikely to decrease. Therefore, it is advantageous to restart the engine 12 before the hybrid vehicle 10 stops.

The first and second embodiments can be modified and implemented as follows. The present embodiment and the following modified examples can be implemented in combination with each other within a technically consistent range.

In the first and second embodiments described above, the hybrid vehicle 10 is an automatic transmission vehicle. However, the hybrid vehicle 10 may be, for example, a manual transmission vehicle.

In the first and second embodiments, the relay 46 is provided between the inverter 42 and the battery 44. For example, the relay 46 may be provided between the inverter 42 and the motor generator MG. The position of the relay 46 can be changed as long as the motor generator MG can be connected to or disconnected from the battery 44.

In the first and second embodiments described above, the MG rotational speed threshold determination process is executed. However, for example, the MG rotational speed threshold may be a fixed value.

In the first and second embodiments described above, in the negative torque application process, the magnitude of the negative torque is determined according to the AT oil temperature ATT. Further, in the negative torque application process, the upper limit of the magnitude of the negative torque is determined according to the MG rotational speed. However, such processing can be changed as appropriate. For example, the magnitude of the negative torque may be a fixed value.

The relay opening condition can be changed as appropriate. For example, condition (A) that the engine 12 has stopped can be omitted. Furthermore, it is optional that condition (C) hybrid vehicle 10 has stopped.

In the first and second embodiments, the MG rotational speed threshold increases linearly as the AT oil temperature ATT increases (see FIG. 3). However, the MG rotational speed threshold may be switched stepwise according to the AT oil temperature ATT. For example, the MG rotational speed threshold may be switched in two steps depending on whether the AT oil temperature ATT is larger than a predetermined value.

In the first and second embodiments, the magnitude of the negative torque decreases linearly as the AT oil temperature increases (see FIG. 5). However, the magnitude of the negative torque may be changed stepwise according to the AT oil temperature ATT.

In the first embodiment, the upper limit of the magnitude of the negative torque decreases linearly as the MG rotational speed decreases (see FIG. 6). However, the upper limit of the magnitude of the negative torque may be changed stepwise according to the MG rotational speed.

In the first and second embodiments described above, the controller 70 includes a CPU and a ROM, and executes software processing. However, this is only an example. For example, the controller 70 may include a dedicated hardware circuit (e.g., ASIC, etc.) that processes at least part of the software processing performed in the above embodiment. That is, the controller 70 may have any of the following configurations (a) to (c). (a) The controller 70 includes a processing device that executes all processing according to the program, and a program storage device such as a ROM that stores the program. That is, the controller 70 includes a software execution device. (b) The controller 70 includes a processing device that executes a part of processing according to a program and a program storage device. In addition, the controller 70 includes a dedicated hardware circuit that performs the rest of the processing. (c) The controller 70 includes a dedicated hardware circuit that executes all processing. Here, there may be a plurality of software execution devices and/or dedicated hardware circuits. That is, the processing may be performed by processing circuitry comprising at least one of the software execution device or the dedicated hardware circuit. There may be a plurality of software execution devices and dedicated hardware circuits included in the processing circuitry. A program storage device or computer-readable medium includes any available medium accessible by a general purpose or dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A hybrid vehicle controller for controlling a hybrid vehicle including a hybrid system, wherein
    the hybrid system includes an engine, a motor generator, a battery configured to supply power with the motor generator, a clutch configured to connect the engine to the motor generator, and a relay configured to connect the motor generator to the battery,
    the hybrid vehicle controller comprising:
    processing circuitry configured to execute, when an operation requesting opening of the relay is performed
        a process that releases the clutch,
        a negative torque application process that applies a negative torque, which is a torque for lowering a rotational speed of the motor generator, to the motor generator, after releasing the clutch, and
        a process that releases the relay when the rotational speed of the motor generator becomes less than a threshold.

2. The hybrid vehicle controller according to claim 1, wherein
    the processing circuitry is configured to terminate the negative torque application process when the rotational speed of the motor generator becomes less than the threshold.

3. The hybrid vehicle controller according to claim 2, wherein
    the negative torque application process includes a restriction process that restricts a magnitude of the negative torque,
    the restriction process restricts the magnitude of the negative torque to a smaller value when the rotational speed of the motor generator is closer to the threshold.

4. The hybrid vehicle controller according to claim 1, wherein
    the processing circuitry is configured to perform the negative torque application process on condition that the hybrid vehicle is stopped.

5. The hybrid vehicle controller according to claim 1, wherein
    the processing circuitry is configured to execute a determination process that determines whether the hybrid vehicle is stopped,
    the determination process is a process that determines that the hybrid vehicle is stopped when a vehicle speed is equal to or less than a specified value, and
    the processing circuitry is configured to start the negative torque application process when it is determined through the determination process that the hybrid vehicle is stopped.

6. The hybrid vehicle controller according to claim 2, wherein
    the hybrid system further includes a transmission including a torque converter,
    an output shaft of the engine is connected to a first end of a rotating shaft of the motor generator via the clutch,
    a second end of the rotating shaft is connected to the torque converter,
    the processing circuitry is configured to set the threshold to a larger value as an oil temperature, which is a temperature of an oil in the torque converter, is higher.

7. The hybrid vehicle controller according to claim 2, wherein
    the hybrid system further includes a transmission including a torque converter,
    an output shaft of the engine is connected to a first end of a rotating shaft of the motor generator via the clutch,
    a second end of the rotating shaft is connected to the torque converter,
    the processing circuitry is configured to set a magnitude of the negative torque to a smaller value as an oil temperature, which is a temperature of an oil in the torque converter, is higher.

* * * * *